US009289755B2

(12) United States Patent
Lai et al.

(10) Patent No.: US 9,289,755 B2
(45) Date of Patent: Mar. 22, 2016

(54) SYNTHESIS OF ZSM-5 CRYSTALS WITH IMPROVED MORPHOLOGY

(71) Applicants: Wenyih Frank Lai, Bridgewater, NJ (US); Nicholas S. Rollman, Hamburg, PA (US)

(72) Inventors: Wenyih Frank Lai, Bridgewater, NJ (US); Nicholas S. Rollman, Hamburg, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 364 days.

(21) Appl. No.: 14/063,295

(22) Filed: Oct. 25, 2013

(65) Prior Publication Data

US 2014/0162867 A1 Jun. 12, 2014

Related U.S. Application Data

(60) Provisional application No. 61/734,437, filed on Dec. 7, 2012.

(51) Int. Cl.
*C01B 39/40* (2006.01)
*B01J 29/40* (2006.01)
*B01J 20/18* (2006.01)
*B01J 20/30* (2006.01)

(52) U.S. Cl.
CPC *B01J 29/40* (2013.01); *B01J 20/18* (2013.01); *B01J 20/3085* (2013.01); *C01B 39/40* (2013.01)

(58) Field of Classification Search
CPC .................. C01B 39/40; B01J 29/40
See application file for complete search history.

(56) References Cited

U.S. PATENT DOCUMENTS

| 3,354,078 | A | 11/1967 | Miale et al. |
| 3,702,866 | A | 11/1972 | Salvesen et al. |
| 3,832,449 | A | 8/1974 | Rosinski et al. |
| 4,375,458 | A | 3/1983 | Dwyer et al. |
| 4,452,769 | A | 6/1984 | Chu et al. |
| 4,537,758 | A | 8/1985 | Chu et al. |

(Continued)

FOREIGN PATENT DOCUMENTS

| CN | 101332995 B | 12/2010 |
| CN | 102464334 A | 5/2012 |

OTHER PUBLICATIONS

Weisz, P.B. and Miale, J.N., "Superactive Crystalline Aluminosilicate Hydrocarbon Catalysts", Journal of Catalysis, vol. 4, p. 527-529, 1965.

(Continued)

*Primary Examiner* — David M Brunsman
(74) *Attorney, Agent, or Firm* — Larry E. Carter; David M. Weisberg

(57) ABSTRACT

Methods are provided for synthesizing crystals having a ZSM-5 framework structure from synthesis mixtures suitable for synthesis of ZSM-12 framework structure crystals in the absence of seed crystals with a ZSM-5 framework structure, such as in the absence of any seed crystals. For synthesis mixtures with a sufficiently high $XO_2:Y_2O_3$ ratio, seeding a synthesis mixture with ZSM-5 seed crystals can result in production of pure phase ZSM-5 crystals with a new morphology. The morphology can include rod-like primary crystallites with a length of about 0.5 μm or less that are organized/aggregated into larger secondary crystal structures. The aggregation of the primary crystallites into a secondary crystal structure can allow for an unexpectedly large mesoporous surface area for the ZSM-5 crystals.

20 Claims, 6 Drawing Sheets

(56) References Cited

U.S. PATENT DOCUMENTS

| | | | |
|---|---|---|---|
| 5,369,071 A * | 11/1994 | Degnan | C10G 11/05 502/71 |
| 5,672,331 A | 9/1997 | Verduijn | |
| 6,180,550 B1 | 1/2001 | Beck et al. | |
| 6,504,075 B2 | 1/2003 | Beck et al. | |
| 6,893,624 B2 | 5/2005 | Lai et al. | |

OTHER PUBLICATIONS

Miale, J.N., Chen, N.Y. and Weisz, P.B., "Catalysis by Crystalline Aluminosilicates-IV. Attainable Catalytic Cracking Rate Constants, and Superactivity", Journal of Catalysis, vol. 6, p. 278-287, 1966.

Olson, D.H., Haag, W.O. and Lago, R.M., "Chemical and Physical Properties of the ZSM-5 Substitutional Series", Journal of Catalysis, vol. 61, p. 395, 1980.

Zhang et al., "Rapid crystallization and morphological adjustment of zeolite ZSM-5 in nonionic emulsions", Journal of Solid State Chemistry, Oct. 19, 2010, vol. 184, No. 1, pp. 1-6, Elsevier.

Joshi et al., "Toluene Alkylation to Selective Formation of p-Xylene over Co-Crystalline ZSM-12/Zsm-5 Catalyst", Journal of Natural Gas Chemistry, Mar. 1, 2007 vol. 16, No. 1, pp. 37-41, Science Direct, Science Press.

International Search Report with Written Opinion for PCT/US2013/066819 dated Mar. 6, 2014.

* cited by examiner

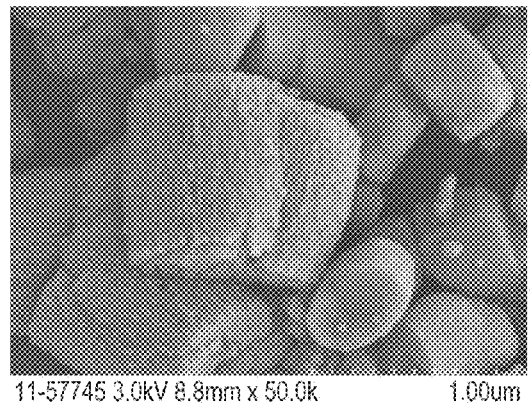
FIG. 8
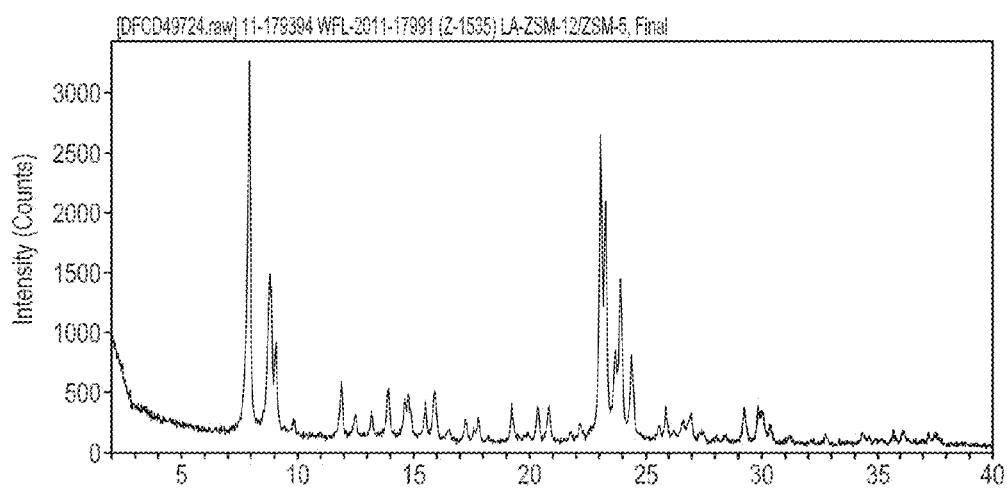
FIG. 9a
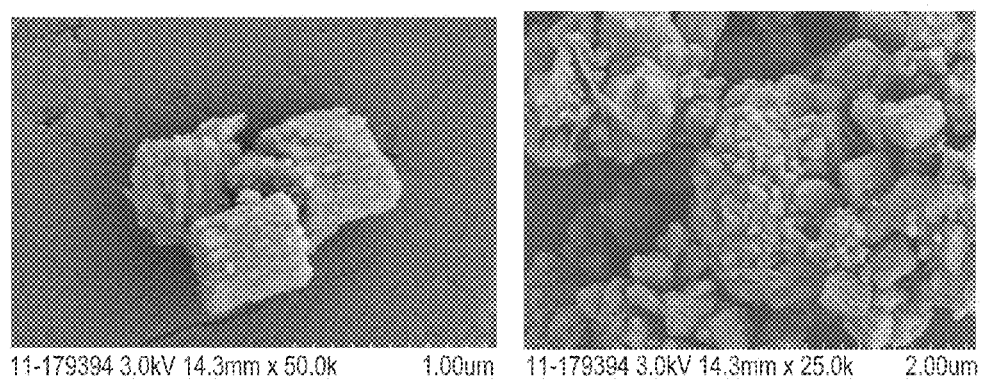
FIG. 9b      FIG. 9c

SYNTHESIS OF ZSM-5 CRYSTALS WITH IMPROVED MORPHOLOGY

CROSS-REFERENCE TO RELATED APPLICATIONS

This application claims the benefit of U.S. Application Ser. No. 61/734,437, filed on Dec. 7, 2012; which is incorporated by reference herein in its entirety.

FIELD OF THE INVENTION

Zeolites with improved morphology are described along with methods for preparing the same.

BACKGROUND OF THE INVENTION

Zeolite crystal structures have found a wide range of applications within refinery processes and other processes for manipulating petroleum streams. Some zeolite applications are catalytic in nature, while other applications focus on the ability of zeolites to selectively adsorb molecules within a gas stream.

One type of zeolite structure used for catalytic processing of petroleum streams is ZSM-5. ZSM-5 is an MFI framework zeolite. U.S. Pat. No. 3,702,866 provides an example of synthesis conditions for forming ZSM-5 crystals. The conditions include use of a tetrapropylammonium salt as a structure directing agent for forming ZSM-5 crystals. Ratios of $SiO_2$:$Al_2O_3$ of 5-100 are generally disclosed for the synthesis mixture, with ratios of 10-60 being described as preferred.

Another type of zeolite structure used for catalytic processing is ZSM-12, which is a zeolite having an MTW framework type. U.S. Pat. No. 3,832,449 provides an example of synthesis conditions for forming ZSM-12 crystals, which include use of a tetraethylammonium salt as a structure directing agent. Ratios of $SiO_2$:$Al_2O_3$ of 40-200 are generally disclosed for the synthesis mixture, with ratios of 85-125 being described as preferred.

U.S. Pat. No. 4,452,769 provides another example of synthesis conditions for forming ZSM-12 crystals, including use of a methyltriethylammonium salt. Ratios of $SiO_2$:$Al_2O_3$ of 40 or higher are generally disclosed for the synthesis mixture (including mixtures with no added alumina), with ratios of 80 or higher being described as preferred.

U.S. Pat. No. 5,672,331 describes method for synthesizing ZSM-5 and other MFI zeolites using various tetraalkylammonium salt structure directing agents. The structure directing agents include tetrapropylammonium salts and tetraethylammonium salts. Some preference is indicated for tetrapropylammonium salts for synthesis of ZSM-5 with a high $SiO_2$:$Al_2O_3$ ratio. A ratio of $OH^-$:$SiO_2$ of 0.1 or less is described as preventing nucleation independent of seed crystals, which allows for production of crystals with a narrower size distribution. For synthesis mixtures with $OH^-$:$SiO_2$ of 0.1 or less, the number of seeds are used to control the crystal size. All of the synthesis examples include the use of a tetrapropylammonium salt as a structure directing agent. One group of examples included an $SiO_2$:$Al_2O_3$ ratio of 340, which led to formation of spherical ZSM-5 crystals. A second group of mixtures had no added alumina but did include fluoride ions. For this second group of mixtures, the crystallites were described as having a "coffin" shape. At a seed crystal weight percentage of about 0.12 wt %, "coffin" shaped crystals with a length of 0.6 μm were reported. The reaction conditions for all examples appeared to include low ratios of other reactants relative to silica. The synthesis conditions were reported as producing uniform particle sizes, but no evidence of organization of the uniform particles was reported.

U.S. Pat. No. 6,180,550 describes methods for synthesizing ZSM-5 zeolite crystals. The ZSM-5 crystals are formed from synthesis mixtures with $SiO_2$:$Al_2O_3$ ratios of 10-25. In at least some examples, ZSM-5 crystals are characterized as having an average size of 0.05 μm or less. The crystals are also described as having high surface area, including mesoporous surface area greater than 45 $m^2/g$.

SUMMARY OF THE INVENTION

In one aspect, a porous crystalline material having the framework structure of ZSM-5 is provided, the crystalline material having an $XO_2$:$Y_2O_3$ ratio of at least about 80, where X is a tetravalent element selected from Si, Ge, Sn, or a combination thereof, and where Y is a trivalent element selected from Al, B, In, Ga, Fe, or a combination thereof; the crystalline material having a mesopore surface area of at least about 100 $m^2/g$; and the crystalline material comprising crystals having a ZSM-5 framework structure and having a rod-like morphology, the crystals having a first crystal dimension corresponding to a crystal length, an average crystal length being about 0.1 μm to about 0.5 μm, and a second crystal dimension with an average dimension value that is about half the average crystal length or less.

In another aspect, a method for synthesizing a crystalline material having the framework structure of ZSM-5 is provided. The method includes forming a synthesis mixture capable of forming crystals with a zeolite framework structure, the mixture comprising water, a tetravalent oxide ($XO_2$), an alkali or alkaline earth hydroxide, and a structure directing agent, the mixture having an $XO_2$:$Y_2O_3$ ratio of at least about 50, the mixture being suitable for formation of crystals having a ZSM-12 framework structure in the absence of seed crystals having a ZSM-5 framework structure; adding from about 0.05 wt % to about 5 wt % of seed crystals having a ZSM-5 framework structure into the synthesis mixture; and recovering substantially pure crystals having a ZSM-5 framework structure from the synthesis mixture, the crystals having a ZSM-5 framework structure having an average size of at least 0.1 μm in at least one dimension, wherein X is a tetravalent element selected from Si, Ge, Sn, or a combination thereof, and wherein Y is a trivalent element selected from Al, B, In, Ga, Fe, or a combination thereof.

In still another aspect, method for synthesizing a material with the framework structure of ZSM-5 is provided. The method includes forming a synthesis mixture capable of forming crystals with a zeolite framework structure, the mixture comprising water, a tetravalent oxide ($XO_2$), an alkali or alkaline earth hydroxide, and a structure directing agent, the mixture having an $XO_2$:$Y_2O_3$ ratio of at least about 100, the structure directing agent being suitable for formation of crystals having a ZSM-12 framework structure in the absence of seed crystals; adding from about 0.05 wt % to about 5 wt % of seed crystals having a ZSM-5 framework structure into the synthesis mixture; and recovering substantially pure crystals having a ZSM-5 framework structure from the synthesis mixture, the crystals having a ZSM-5 framework structure having an average size of at least 0.1 μm in at least one dimension, an $XO_2$:$Y_2O_3$ ratio of at least about 80, and a mesopore surface area of at least about 100 $m^2/g$, wherein X is a tetravalent element selected from Si, Ge, Sn, or a combination thereof, and wherein Y is a trivalent element selected from Al, B, In, Ga, Fe, or a combination thereof.

BRIEF DESCRIPTION OF THE DRAWINGS

FIG. 8 shows an SEM image of ZSM-5 crystals.

FIG. 9a shows an XRD plot of ZSM-5 crystals.

FIGS. 9b and 9c show SEM images of ZSM-5 crystals.

DETAILED DESCRIPTION OF THE EMBODIMENTS

Overview

Figure 1:
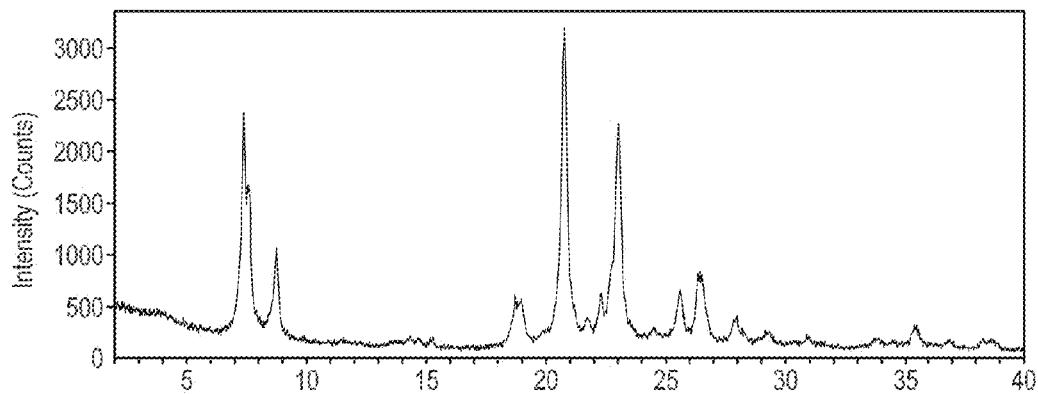
FIG. 1 shows an XRD plot of pure phase ZSM-12 crystals.

In various embodiments, methods are provided for synthesizing ZSM-5 crystals from synthesis mixtures including an $SiO_2:Al_2O_3$ ratio of at least about 50, e.g., at least about 100, and a structure directing agent that conventionally would be considered more suitable for synthesis of ZSM-12. Preferably, the synthesis mixtures correspond to synthesis mixtures that would typically produce ZSM-12 crystals if seed crystals were not introduced into the synthesis mixture.

For synthesis mixtures with a sufficiently high $SiO_2:Al_2O_3$ ratio, such as an $SiO_2:Al_2O_3$ ratio of at least about 100, seeding such synthesis mixtures with ZSM-5 seed crystals can result in production of pure phase ZSM-5 crystals with a new morphology. The morphology can include rod-like primary crystallites with a length of about 0.5 µm or less that are organized/aggregated into larger "barrel" or "wine barrel" secondary crystal structures, where the axes of the 0.5 µm or less rod-like crystals (or elongated crystals) can advantageously be aligned with the long axis of the aggregated barrel structures, which have a length of about 0.5 µm to about 5 µm. The new monolithic structure (or secondary crystal structure) and morphology can result in an unexpectedly large mesoporous surface area and mesopore volume for the secondary crystals.

The reported ranges for synthesis mixtures of ZSM-5 and ZSM-12 can be said to have significant overlap. As an example, Table 1 provides a comparison of the synthesis conditions described for ZSM-5 in U.S. Pat. No. 3,702,866 and for ZSM-12 in U.S. Pat. No. 3,832,449. The structure directing agent (SDA) for the ZSM-5 synthesis mixture is a tetrapropylammonium salt, while the SDA for the ZSM-12 synthesis mixture is a tetraethylammonium salt. Both structure directing agents are represented by $R_4N^+$ in Table 1.

TABLE 1

| Reactants | U.S. Pat. No. 3,702,866 (ZSM-5) | U.S. Pat. No. 3,832,449 (ZSM-12) |
|---|---|---|
| $SiO_2:Al_2O_3$ | 5-100 | 40-200 |
| $R_4N^+:[R_4N^+ + Na^+]$ | 0.2-0.95 | 0.2-0.95 |
| $OH^-:SiO_2$ | 0.07-10 | 0.1-0.4 |
| $H_2O:OH^-$ | 10-300 | 20-300 |

As shown in Table 1, conventional synthesis conditions described for ZSM-5 and ZSM-12 can have broad ranges of overlap. Because of this overlap in conditions that can form ZSM-5 and ZSM-12, the structure directing agent in a synthesis mixture can have a strong influence in determining the type of crystals formed.

It is noted that Table 1 shows the use of $SiO_2$, $Al_2O_3$, and Na for synthesis of the zeolites. In the discussion herein, it should be understood that other crystals having a zeolite framework structure can generally be synthesized using other tetravalent elements in place of or in combination with silicon, such as tin, germanium, or a combination thereof; other trivalent elements in place of or in combination with aluminum, such as boron, indium, gallium, iron, or a combination thereof; and other alkali or alkaline earth elements in place of or in combination with sodium, such as potassium, magnesium, calcium, or a combination thereof. Thus, when a ratio of $SiO_2:Al_2O_3$ is described, it should be understood that those ratios can be generalized to Y and X components collectively, i.e., that similar ratios of $XO_2:Y_2O_3$ may also be suitable for formation of a material having the corresponding zeolite framework structure. In the discussion herein, a crystalline material having a ZSM-5 framework type is defined to include any material that is or would be categorized as having an MFI framework type. Thus, a ZSM-5 crystal is a type of crystal within the definition of a crystal having a ZSM-5 framework type.

Traditionally, a variety of structure directing agents have been used for synthesis of zeolites and/or other microporous materials, with some structure directing agents being preferred for synthesis of structures with a ZSM-12 framework type, while other structure directing agents are preferred for synthesis of structures with a ZSM-5 framework type. With regard to quaternary ammonium salts as structure directing agents, tetraethylammonium salts and methyltriethylammonium salts have been used for selective formation of ZSM-12 rather than ZSM-5. For many types of synthesis mixtures, the structure directing agent can dictate the type of zeolite crystals formed from the mixture. When a seed crystal with a different zeolite topology is introduced into such synthesis mixtures, the expected result can often be that the expected type of zeolite crystals will be formed based on the structure directing agent and the other components in the synthesis mixture. However, it has been unexpectedly discovered that, by introducing ZSM-5 seed crystals into a synthesis mixture including a structure directing agent suitable for ZSM-12 formation, ZSM-5 crystals with a novel combination of crystal size and morphology can be synthesized. Preferably, the ZSM-5 crystals can be formed using a synthesis mixture that would result in formation of ZSM-12 crystals but for the absence of ZSM-5 seed crystals. Additionally or alternately, the ZSM-5 crystals can be formed using a synthesis mixture that does result in formation of ZSM-12 crystals in the absence of seed crystals.

In various embodiments, the ZSM-5 crystals recovered from a reaction mixture can correspond to substantially pure ZSM-5 crystals. Substantially pure ZSM-5 crystals are defined herein as ZSM-5 crystals that contain less than about 10 wt % of another type of zeolite, such as ZSM-12, e.g., as determined by X-ray diffraction (XRD) analysis methods. Preferably, the substantially pure ZSM-5 crystals can contain less than about 8 wt %, such as less than about 5 wt %, less than about 4 wt %, less than about 3 wt %, or no detectable amount (e.g., by XRD) of another type of zeolite.

ZSM-5 Crystal Size and Aggregate Morphology

In various embodiments, methods are provided for synthesizing ZSM-5 crystals (or crystals having a ZSM-5 framework structure) with a beneficial combination of crystal size and crystal morphology. Preferably, the crystals can be formed by starting with a synthesis mixture suitable for formation of ZSM-12. Such a mixture is defined as a synthesis mixture that can and/or would form ZSM-12 if no ZSM-5 seeds are introduced into the mixture, e.g., under typical zeolite formation conditions, such as heating the mixture to an appropriate crystallization temperature and stirring for a period of ~24-240 hours. Additionally or alternately, the synthesis mixture can include a structure directing agent traditionally used for ZSM-12 synthesis in preference to ZSM-5.

ZSM-5 seed crystals can then be introduced into the synthesis mixture suitable for ZSM-12 formation and/or the synthesis mixture that can include a structure directing agent suitable for ZSM-12 formation. Introduction of ZSM-5 seed crystals into such a synthesis mixture can result in formation of (pure phase) ZSM-5 crystals.

The ZSM-5 crystals can be formed from a synthesis mixture having an $SiO_2:Al_2O_3$ ratio of at least about 50, e.g., at least about 100, at least about 150, or at least about 200. This can lead to formation of ZSM-5 crystals with an $SiO_2:Al_2O_3$ content of at least about 50, e.g., at least about 100. Optionally, the ZSM-5 crystals can be formed without adding an alumina source to the synthesis mixture. This can result in ZSM-5 crystals with an alumina content corresponding to alumina impurities from the silica source (or other reaction components) in the synthesis mixture. The individual ZSM-5 crystallites have a rod-like or elongated shape. These rod-like ZSM-5 crystallites can have a first crystal dimension or crystal length of about 0.5 μm or less. The rod-like or elongated ZSM-5 crystallites can have a second crystal dimension (or crystal diameter with a dimension value) that is about half (e.g., about ⅓ or less) of the crystal length or less. The ZSM-5 crystallites can advantageously have orthorhombic symmetry.

For ZSM-5 crystals formed from a synthesis mixture with an $SiO_2:Al_2O_3$ ratio of at least about 100, e.g., at least about 150 or at least about 200, the rod-like primary crystallites can aggregate to form aggregated secondary monolithic crystal structures. Preferably, the ZSM-5 crystals resulting from the synthesis mixture can have an $SiO_2:Al_2O_3$ content of at least about 80, e.g., at least about 100. The aggregated monolithic structure can roughly exhibit the shape of a barrel, such as a wine cask. The aggregated monolithic structure can be present but may be less well defined for crystals formed from a synthesis mixture with an $SiO_2:Al_2O_3$ ratio of at least about 100 but less than about 150. The barrel structure can become more clearly defined as the ratio increases. This barrel description is meant to be approximate, as the individual primary rod-like crystallites may not form a completely space-filling representation of such a barrel. Instead, the barrel description is used herein to provide a convenient label for referring to the aggregated monolithic structure. In a suitable reaction mixture, at least about 50 vol % of the ZSM-5 crystalline material can correspond to ZSM-5 primary crystallites aggregated to form aggregated secondary monolithic crystal structures.

In the aggregated barrel structure, the crystal length of the individual ZSM-5 rod-like crystallites can be substantially aligned with the long axis of the barrel. In the discussion herein, a crystallite that is part of an aggregated monolithic structure can be defined to have a crystal length substantially aligned with an axis of the aggregated monolithic structure when the axis of the crystal is within about 5° of being parallel with the axis of the aggregated monolithic structure. Preferably, at least 95 wt % of the primary crystallites forming a secondary barrel structure can be substantially aligned with the axis of the monolithic (barrel) structure.

The barrel shape can roughly correspond to a right circular cylinder (i.e., a typical barrel shape), or the shape can roughly correspond to an elliptical cylinder. The length of the barrel shape can be at least 5 times (e.g., at least 10 times) the length of an individual rod-like crystallite. For the circular dimension, the barrel structure can have a width or diameter that is at least about 10 times (e.g., at least about 15 times or at least about 20 times) the diameter (dimension value of the second crystal dimension) of the individual primary ZSM-5 crystallites. For a barrel with a shape more similar to an elliptical shape, the major axis of the elliptical shape can be at least about 10 times (e.g., at least about 15 times or at least about 20 times) the diameter of the individual primary ZSM-5 crystallites, while the minor axis can be at least about 10 times the diameter of the individual ZSM-5 crystallites. It is noted that the diameter of the barrel can vary along the long axis of the barrel.

Figure 5A:
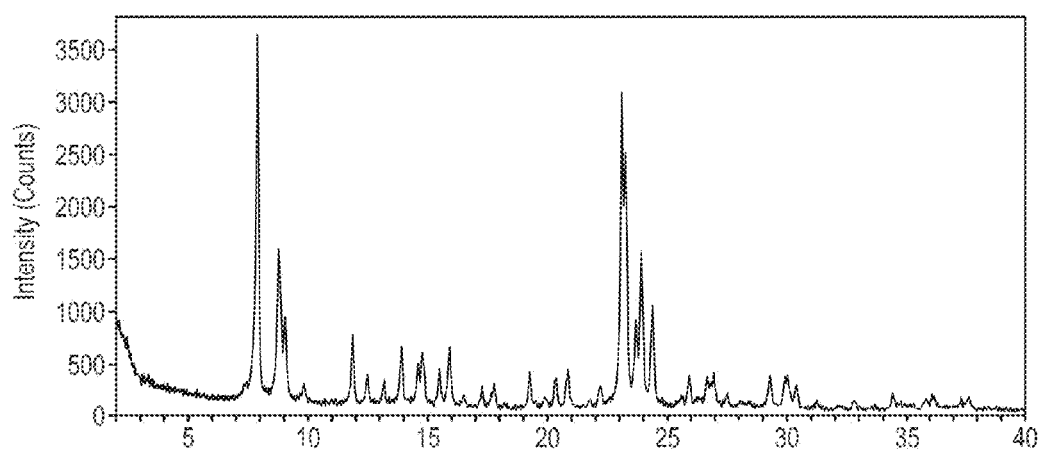
FIG. 5a shows an XRD plot of ZSM-5 crystals.
Figure 5B:
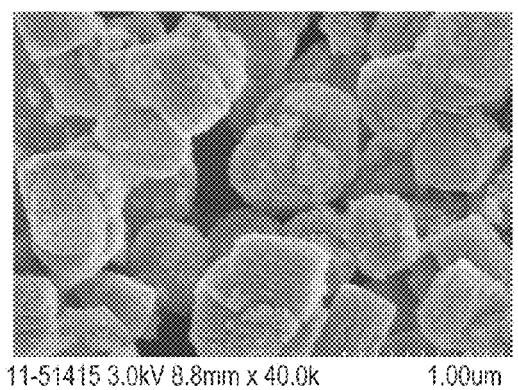
FIGS. 5b and 5c show SEM images of ZSM-5 crystals.
Figure 5C:
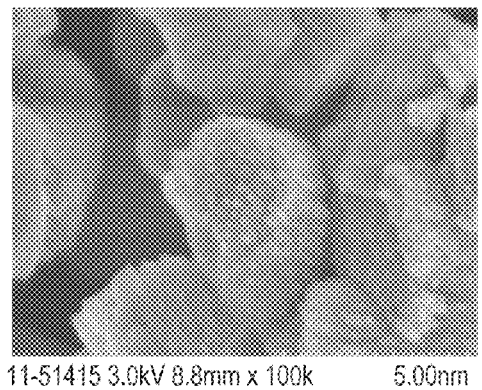
Figure 6A:
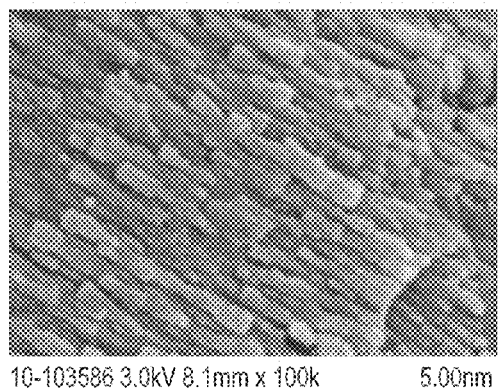
FIGS. 6a and 6b show SEM images of ZSM-5 crystals.
Figure 6B:
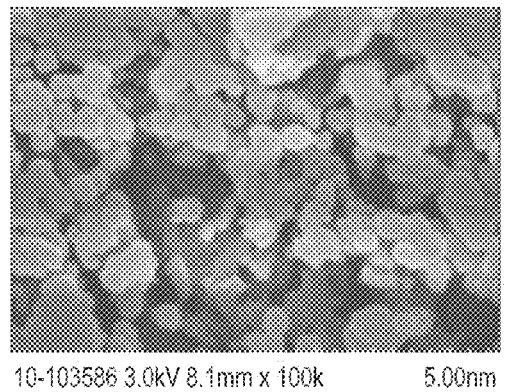

FIGS. 5b, 5c, 6a, 6b, and 12 show examples of this aggregated barrel morphology. FIG. 5b shows a typical example of the barrel morphology for ZSM-5 crystals formed from a synthesis mixture with a $SiO_2:Al_2O_3$ ratio of about 250. The view in FIG. 5b is a side view that shows the rough alignment of the individual rod-like crystallites with the long axis of the barrel. FIG. 6a shows a higher magnification view of the barrel morphology for ZSM-5 crystals from another synthesis. From this higher magnification view, it appears that the alignment of the individual crystallites with the axis of the barrel was relatively good. It also appears that the crystallites may not have been forming a close packed structure, as there were various alignment faults and/or other imperfections in the structure relative to a true close-packed morphology. FIGS. 5c and 6b provide end-on views of barrel morphology agglomerates. The divergence from a close-packed structure can be still more apparent in these views. Once again, the alignment of individual crystallites with the barrel axis appears to be good, but there appear to be significant gaps between primary crystallites in the secondary barrel-shaped crystals at various locations relative to a close-packed morphology.

Figure 12:
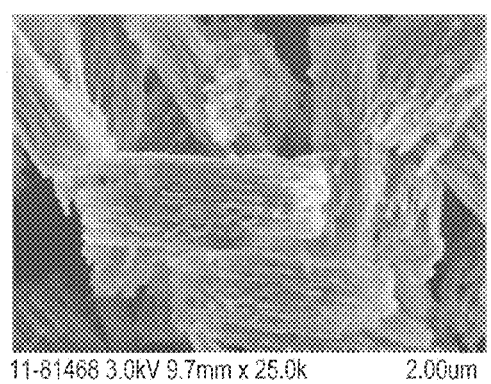
FIG. 12 shows an SEM image of ZSM-5 crystals.

FIG. 12 shows a side view of ZSM-5 crystals formed from a synthesis mixture with an $SiO_2:Al_2O_3$ ratio of about 100. In comparison with the morphology in FIG. 5b, the barrel shape in FIG. 12 appears to be less well defined, and the alignment or organization of the rod-like crystallites relative to the barrel shape also appears to be less consistent.

In addition to providing a new type of morphology, the ZSM-5 crystals can also have an unexpectedly high mesoporous surface area and mesopore volume relative to the size of the crystals. The surface area of a zeolite can roughly be categorized as a combination of microporous surface area and mesoporous surface area. Microporous surface area can correspond to surface area present in the pore network or framework of a zeolite. Mesoporous surface area can represent the surface area of a zeolite crystal external to the pores but still bounded by crystal structures (e.g., between crystal grains in an agglomerate). Surface area can typically be reported as a bulk property, such as a surface area per gram of zeolite.

Crystals with a higher mesoporous surface area may be valuable in applications related to catalytic reactions of hydrocarbons (or compounds similar to hydrocarbons), as it is believed that higher mesoporous surface area crystals can sometimes have a lower tendency to coke and/or may have a longer catalyst lifetime. Additionally, a higher mesoporous surface area may allow a larger number of compounds to react, e.g., without having to work their way through the pore structure of the zeolite, which can reduce the importance of diffusion into the zeolite crystals as a factor in catalyzing a reaction. Changing the relative amounts of mesoporous and microporous surface area can also potentially affect the selectivity of a zeolite for some types of reactions.

Because mesoporous surface area can represent an surface area for zeolite crystals external to the pores, the mesoporous surface area per gram of zeolite could be expected to decrease with increasing crystal size. This could be due to the fact that, for a given morphology, a larger crystal can typically have a greater percentage of crystal structure internal to the crystal shape. The microporous surface area, mesoporous surface area, and total surface area (e.g., a BET surface area) for a zeolite can be measured conventionally, e.g., using nitrogen sorption isotherms. ASTM D4365-95 provides an example of a method for measuring zeolite surface area.

In the SEM micrographs in FIGS. 5$b$, 5$c$, 6$a$, 6$b$, and 12, it was apparent that the ZSM-5 primary crystallites did not form a close-packed secondary aggregate structure. Instead, the barrel morphology appeared to include many gaps that would facilitate movement of potential reactants between individual crystallites and into the interior of the morphology. This loose structure would be expected to preserve and/or enhance the mesoporous surface area of the crystals.

In various embodiments, ZSM-5 primary crystals or crystallite can be provided to have a characteristic dimension (i.e., length of the rod-like structure) of at least 0.1 μm while also having a mesoporous surface area of at least about 100 m$^2$/g. Conventionally, a mesoporous surface area of greater than 50 m$^2$/g, e.g., greater than 100 m$^2$/g, would indicate ZSM-5 crystals with a characteristic length on the order of about 0.05 μm or less. By contrast, the ZSM-5 crystals described herein can advantageously exhibit a mesoporous surface area greater than about 100 m$^2$/g with a characteristic length of at least twice what would be expected.

In various embodiments, the highly crystalline phase of ZSM-5 crystals can have a mesoporous surface area of at least about 100 m$^2$/g, e.g., at least about 120 m$^2$/g or at least about 150 m$^2$/g. The total surface area of the ZSM-5 crystals (micropore plus mesopore) can be at least about 300 m$^2$/g, e.g., at least about 350 m$^2$/g or at least about 400 m$^2$/g.

The ZSM-5 crystals can have an Alpha value of at least 20, e.g., at least 100 or at least 200. The alpha value test is a measure of the cracking activity of a catalyst and is described in U.S. Pat. No. 3,354,078 and in the Journal of Catalysis, Vol. 4, p. 527 (1965); Vol. 6, p. 278 (1966); and Vol. 61, p. 395 (1980), each of which is incorporated herein by reference as to that description. The experimental conditions of the test used herein include a constant temperature of ~538° C. and a variable flow rate as described in detail in the Journal of Catalysis, Vol. 61, p. 395.

Conditions for Formation of ZSM-5 Crystals

In order to form ZSM-5 crystals with a desired combination of crystal size and morphology, the synthesis mixture used can be suitable for formation of ZSM-12 crystals and/or a structure directing agent used can be particularly suitable for ZSM-12 formation. A synthesis mixture suitable for formation of ZSM-12 crystals is defined herein as a synthesis mixture that can (and preferably that would) yield ZSM-12 crystals under typical zeolite crystal formation conditions, if ZSM-5 seeds were not introduced into the mixture during crystal formation. Optionally but preferably, the synthesis mixture can produce ZSM-12 crystals under typical zeolite crystal formation conditions, if no seeds at all were introduced into the mixture during crystal formation. Additionally or alternately, the synthesis mixture suitable for formation of ZSM-12 crystals can be a synthesis mixture including a tetraalkylammonium salt structure directing agent, such as a tetraethylammonium hydroxide or other salt, or a methyltriethylammonium hydroxide or other salt.

Table 2 below provides examples of suitable conditions for forming ZSM-12 crystals. In Table 2, "M" refers to an alkali or alkaline earth metal cation, such as a sodium cation, and "SDA" refers to the structure directing agent. Table 2 provides molar ratios for the various components in the synthesis mixture.

TABLE 2

| Reactants | Suitable | Preferred |
|---|---|---|
| SiO$_2$:Al$_2$O$_3$ | 40 or higher* | 80 or higher* |
| H$_2$O:SiO$_2$ | 5-200 | 10-40 |
| OH$^-$:SiO$_2$ | 0.03-1.2 | 0.1-0.6 |
| M:SiO$_2$ | 0.03-1.2 | 0.1-0.6 |
| SDA:SiO$_2$ | 0.05-0.6 | 0.1-0.4 |

*including no intentionally added source of alumina

The structure directing agent can be any suitable structure directing agent so that the synthesis mixture would form ZSM-12 without seed crystals and/or without introduction of ZSM-5 seeds. The structure directing agent can comprise or be a quaternary ammonium salt, e.g., tetraethylammonium salt, methyltriethylammonium salt, benzyltriethylammonium salt, dibenzyldimethylammonium salt, or a combination thereof. Other potential structure directing agents can include, but are not necessarily limited to, hexamethyleneamine salts, dimethylhexamethyleneamine salts, decamethonium salts, diquaternary ammonium salts, and/or combinations thereof that can be suitable for forming ZSM-12. Preferably, the structure directing agent can comprise or be a tetraalkylammonium salt, such as a tetraethylammonium salt and/or a methyltriethylammonium salt. The counterion in the SDA salt can be any convenient counterion, including a halide ion such as Cl$^-$, Br$^-$, and/or I$^-$, and/or a hydroxide ion.

Although the synthesis mixture may be suitable for formation of ZSM-12, formation of ZSM-5 crystals can be facilitated by introducing ZSM-5 seed crystals into the synthesis mixture. Preferably, the seed crystals correspond to ZSM-5 seed crystals with a crystal size of about 0.5 μm or less, e.g., about 0.25 μm or less or about 0.1 μm or less. The amount of seed crystals added to the synthesis mixture can be from about 0.05 wt % to about 10 wt %.

After seeding with ZSM-5 seed crystals, the mixture can be maintained at a temperature of about 200° C. or less, e.g., from about 130° C. to about 160° C., with stirring for about 24 hours to about 240 hours. The resulting ZSM-5 crystals can then be separated from the remainder of the synthesis mixture.

When a synthesis mixture is initially formed, the temperature of the synthesis mixture can be increased to the desired synthesis temperature in any convenient manner. For example, the temperature of the synthesis mixture can be increased by at least 10° C. per hour, e.g., at least 25° C. per hour, at least 40° C. per hour, or at least 75° C. per hour, until the desired synthesis temperature is achieved. The stirring rate can be any convenient stir rate, such as from about 25 rpm to about 500 rpm, e.g., depending on the size of the vessel and the nature of the stirring device.

After formation of the ZSM-5 crystals, the product can be filtered, washed with deionized (DI) water, and dried at a suitable temperature for removing water, such as from about 100° C. to about 160° C. or from about 100° C. to about 140° C.

In its as-synthesized form, the ZSM-5 crystals can contain the organic material(s) used as the directing agent. Prior to use as a catalyst or adsorbent, the as-synthesized material can normally be treated to remove all or part of the organic constituent, e.g., by heating the as-synthesized material at a temperature from about 250° C. to about 550° C. for a period of time from about 1 hour to about 48 hours.

To the extent desired, the original cations of the as-synthesized material, such as sodium cations, can be replaced in accordance with techniques well known in the art, at least in part, by ion exchange with other cations. When desired, preferred replacing cations can include metal ions, hydrogen ions, hydrogen precursor ions (e.g., ammonium ions), or combinations thereof. Again when desired, particularly preferred cations can include those which can tailor the catalytic activity for certain hydrocarbon conversion reactions, which can include hydrogen, rare earth metals, and/or metals of Groups IIA, IIIA, IVA, VA, IB, IIB, IIIB, IVB, VB, VIIB, VIIB, and VIII of the Periodic Table of the Elements.

The crystalline material of this invention, when employed as an adsorbent and/or as a catalyst in an organic compound conversion process, can typically be at least partially dehydrated, e.g., by heating to a temperature from about 200° C. to about 370° C. in an atmosphere such as air or nitrogen, and at atmospheric, subatmospheric, or superatmospheric pressures for between 30 minutes and 48 hours. Dehydration can additionally or alternately be performed at room temperature (~20-25° C.) merely by placing the ZSM-5 in a vacuum, but a longer time may be required to sufficiently dehydrate.

Optionally, the crystals can be calcined at a temperature from about 350° C. to about 925° C., e.g., for a time from about 1 minute to about 6 hours, e.g., from about 1 minute to about 20 minutes. To reach the calcination temperature, the temperature of the oven or other device for heating the crystals can be ramped in increments of 50° C., 100° C., or another convenient increment. The crystals can optionally be held at the incremental temperatures for a period of time prior to continuing to increase the temperature to the desired final calcination temperature, if desired. Such intermittent incremental heating can allow water vapor to exit the crystal structure while reducing/minimizing damage and/or morphology changes in the crystals.

X-ray Diffraction (XRD) analysis can be used to verify the crystal structure of resulting crystals. Scanning Electron Microscopy (SEM) can be used to generate micrographs for visualizing the resulting crystals.

Synthetic ZSM-5 crystals prepared in accordance with the invention can be used either in the as-synthesized form, in the hydrogen form, or in another (univalent or multivalent) cationic form. They can additionally or alternately be used in intimate combination with a hydrogenating component such as tungsten, vanadium, molybdenum, rhenium, nickel, cobalt, chromium, manganese, and/or one or more noble metals such as platinum and/or palladium, where a hydrogenation-dehydrogenation function can be desired. Such components can be exchanged into the composition, impregnated therein, and/or physically intimately admixed therewith.

When used as a catalyst, it may be desirable to incorporate the ZSM-5 of the invention with another material resistant to the temperatures and other conditions employed in certain organic conversion processes. Such matrix materials can include active and inactive materials and synthetic or naturally occurring zeolites, as well as inorganic materials such as clays, silica and/or metal oxides, e.g., alumina, titania, magnesia, ceria, and/or zirconia. The latter inorganic materials may be either naturally occurring or in the form of gelatinous precipitates, sols, or gels, including mixtures of silica and metal oxides. Use of an active material in conjunction (combined) with the ZSM-5 may enhance the conversion and/or selectivity of the catalyst in certain organic conversion processes. Inactive materials can suitably serve as diluents/fillers to control the amount of conversion in a given process, so that products can be obtained economically and orderly without employing other means for controlling reaction rate, temperature, etc. Frequently, crystalline catalytic materials have been incorporated into naturally occurring clays, e.g., bentonite and/or kaolin. These materials (clays, oxides, etc.) can function, in part, as binders for the catalyst, e.g., to enhance certain physical properties. It can be desirable to provide a catalyst having good crush strength, for instance, because the catalyst in a petroleum refinery can often be subjected to rough handling, which can tend to attrit/break the catalyst into powder-like materials that can cause problems in processing.

Naturally occurring clays that can be composited with the hereby synthesized crystalline material can include, but are not limited to, the montmorillonite and/or kaolin families (including the subbentonites, and the kaolins commonly known as Dixie, McNamee, Georgia and Florida clays, or others in which the main mineral constituent is halloysite, kaolinite, dickite, nacrite, or anauxite). Such clays can be used in the raw state as originally mined and/or initially subjected to calcination, acid treatment, and/or chemical modification.

In addition or alternately to the foregoing materials, the present crystals can be composited with a porous matrix material such as silica-alumina, silica-magnesia, silica-zirconia, silica-thoria, silica-beryllia, silica-titania, and/or ternary compositions such as silica-alumina-thoria, silica-alumina-zirconia, silica-alumina-magnesia, and silica-magnesia-zirconia. The porous matrix may be in the form of a cogel. A mixture of these components could also be used.

One example of an application for ZSM-5 crystals is use of ZSM-5 as a catalyst for fluid catalytic cracking (FCC) of a petroleum or other feed containing hydrocarbons, including hydrocarbonaceous compound that contain heteroatoms typically found in petroleum feeds. The ZSM-5 can be formulated with one or more adsorbed metals and/or with one or more binder materials as described above.

Other Embodiments

Additionally or alternately, the present invention can include one or more of the following embodiments.

Embodiment 1

A porous crystalline material having the framework structure of ZSM-5, the crystalline material having an $XO_2:Y_2O_3$ ratio of at least about 80, where X is a tetravalent element selected from Si, Ge, Sn, or a combination thereof, and where Y is a trivalent element selected from Al, B, In, Ga, Fe, or a combination thereof; the crystalline material having a mesopore surface area of at least about 100 $m^2/g$; and the crystalline material comprising crystals having a ZSM-5 framework structure and having a rod-like morphology, the crystals having a first crystal dimension corresponding to a crystal length, an average crystal length being about 0.1 µm to about 0.5 µm, and a second crystal dimension with an average dimension value that is about half the average crystal length or less, the crystals preferably being ZSM-5 crystals.

Embodiment 2

The crystalline material of embodiment 1, wherein at least 50 vol % of the crystals having a ZSM-5 framework structure are primary crystallites that form secondary crystal aggregates, the first crystal dimension of the primary crystallites in the secondary crystal aggregates being substantially aligned, the secondary crystal aggregates having an average aggregate length that is at least 5 times the average crystal length, the crystal aggregates having an average aggregate width that is at least 10 times the average dimension value of the second crystal dimension.

Embodiment 3

The crystalline material of any one of the previous embodiments, wherein X is Si and Y is Al.

Embodiment 4

The crystalline material of any one of the previous embodiments, wherein the ratio of $XO_2:Y_2O_3$ is at least about 100, e.g., at least about 150 or at least about 200.

Embodiment 5

The crystalline material of any one of the previous embodiments, wherein the mesopore surface area is at least about 120 $m^2/g$, e.g., at least about 150 $m^2/g$.

Embodiment 6

The crystalline material of any one of the previous embodiments, wherein the crystalline material is substantially pure, the substantially pure crystalline material comprising less than 10 wt % of crystalline material that has a framework structure different from a ZSM-5 framework structure.

Embodiment 7

The crystalline material of any one of the previous embodiments, wherein the total surface area of the crystals having a ZSM-5 framework structure is at least about 300 $m^2/g$, e.g., at least about 350 $m^2/g$ or at least about 400 $m^2/g$.

Embodiment 8

The crystalline material of any one of the previous embodiments, wherein at least a portion of the crystals having a ZSM-5 framework structure contain a structure directing agent disposed within pores thereof.

Embodiment 9

A method for synthesizing a crystalline material having the framework structure of ZSM-5, comprising: forming a synthesis mixture capable of forming crystals with a zeolite framework structure, the mixture comprising water, a tetravalent oxide ($XO_2$), an alkali or alkaline earth hydroxide, and a structure directing agent, the mixture having an $XO_2:Y_2O_3$ ratio of at least about 50, the mixture being suitable for formation of crystals having a ZSM-12 framework structure in the absence of seed crystals having a ZSM-5 framework structure, preferably in the absence of seed crystals; adding from about 0.05 wt % to about 5 wt % of seed crystals having a ZSM-5 framework structure into the synthesis mixture; and recovering (preferably substantially pure) crystals having a ZSM-5 framework structure, preferably ZSM-5 crystals, from the synthesis mixture, the crystals having a ZSM-5 framework structure having an average size of at least 0.1 µm in at least one dimension, wherein X is a tetravalent element selected from Si, Ge, Sn, or a combination thereof, preferably Si, and wherein Y is a trivalent element selected from Al, B, In, Ga, Fe, or a combination thereof, preferably Al.

Embodiment 10

The method of embodiment 9, wherein the ratio of $XO_2:Y_2O_3$ in the synthesis mixture is at least about 100, e.g., at least about 150 or at least about 200.

Embodiment 11

The method of embodiment 9 or embodiment 10, wherein the recovered crystals having a ZSM-5 framework structure have a mesopore surface area of at least about 100 $m^2/g$, e.g., at least about 120 $m^2/g$ or at least about 150 $m^2/g$.

Embodiment 12

The method of any one of embodiments 9-11, wherein the recovered crystals having a ZSM-5 framework structure have an $XO_2:Y_2O_3$ ratio of at least about 80, e.g., at least about 100, at least about 120, or at least about 150.

Embodiment 13

The method of embodiment 12, wherein at least 50 vol % of the recovered crystals are primary crystallites that form secondary crystal aggregates, a first crystal dimension of the primary crystallites in the secondary crystal aggregates being substantially aligned, the first crystal dimension having an average size of at least about 0.1 µm, the secondary crystal aggregates having an average aggregate length that is at least 5 times the average crystal length, the crystal aggregates having an average aggregate width that is at least 10 times the average dimension value of the second crystal dimension.

Embodiment 14

The method of any one of embodiments 9-13, wherein the structure directing agent comprises or is a tetraalkylammonium salt, e.g., a tetraethylammonium salt, a methyltriethylammonium salt, and/or a benzyltriethylammonium salt.

Embodiment 15

The method of any one of embodiments 9-14, wherein the mixture being suitable for formation of crystals having a ZSM-12 framework structure in the absence of seed crystals and/or in the absence of crystals having a ZSM-5 framework structure comprises a synthesis mixture containing a structure directing agent suitable for formation of crystals having a ZSM-12 framework structure in the absence of seed crystals.

EXAMPLES

Comparative Example 1

Formation of ZSM-12 Without Use of Seed Crystals

ZSM-12 was synthesized using a mixture including tetraethylammonium bromide (TEABr) as the structure directing agent. The mixture was prepared to include water, a ~50 wt % solution of TEABr (in water), a ~50 wt % solution of NaOH (in water), a ~47% solution of aluminum sulfate (in water), and Hi-Sil™ 233 silica (~87 wt % SiO$_2$). The mixture had the molar composition shown in Table 3 below.

TABLE 3

| Comparative Example 1 | |
| --- | --- |
| Reactants | Molar ratio |
| SiO$_2$:Al$_2$O$_3$ | ~250 |
| H$_2$O:SiO$_2$ | ~18.4 |
| OH$^-$:SiO$_2$ | ~0.15 |
| M:SiO$_2$ | ~0.16 |
| SDA:SiO$_2$ | ~0.27 |

The mixture was reacted at ~280° F. (~138° C.) in an autoclave with stirring at ~250 rpm for ~72 hours. The product was filtered, washed with deionized (DI) water, and dried at ~250° F. (~120° C.). FIG. 1 shows the XRD pattern of the as-synthesized material, which appeared to exhibit the typical pattern for a pure phase ZSM-12 product. The SEM of the as-synthesized material shows that the material was composed of agglomerates of small crystals. Based on the SEM analysis, the average crystal size was determined to be <0.05 microns.

Comparative Example 2

Formation of ZSM-12 Without Use of Seed Crystals

ZSM-12 was synthesized using a mixture including tetraethylammonium bromide (TEABr) as the structure directing agent. The mixture was prepared to include water, a ~50 wt % solution of TEABr (in water), a ~50 wt % solution of NaOH (in water), a ~47% solution of aluminum sulfate (in water), and Hi-Sil™ 233 silica (~87 wt % SiO$_2$). The mixture had the molar composition shown in Table 4 below.

TABLE 4

| Comparative Example 2 | |
| --- | --- |
| Reactants | Molar ratio |
| SiO$_2$:Al$_2$O$_3$ | ~250 |
| H$_2$O:SiO$_2$ | ~18.4 |
| OH$^-$:SiO$_2$ | ~0.15 |
| M:SiO$_2$ | ~0.16 |
| SDA:SiO$_2$ | ~0.27 |

Figure 2A:
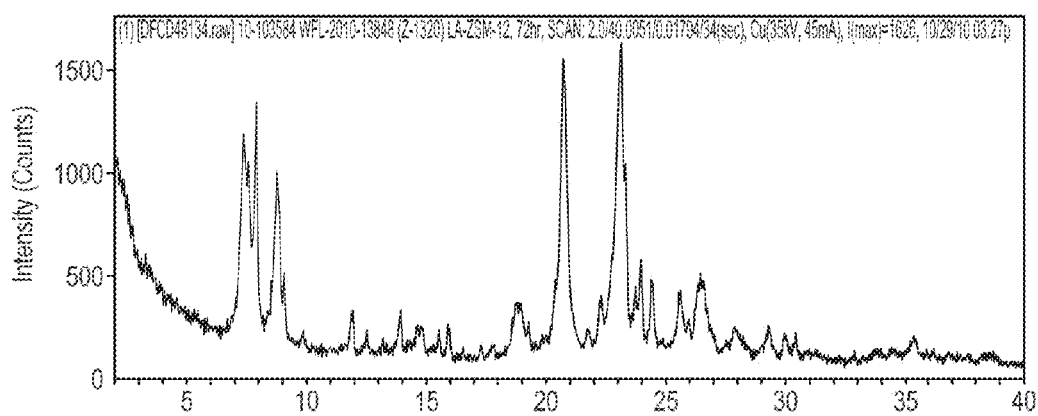
FIG. 2a shows an XRD plot of ZSM-12 crystals with ZSM-5 impurities.
Figure 2B:
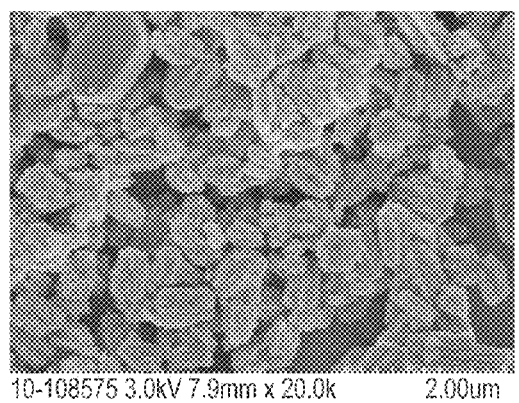
FIG. 2b shows SEM images of ZSM-12 crystals with ZSM-5 impurities.

The mixture was reacted at ~280° F. (~138° C.) in an autoclave with stirring at ~250 rpm for ~72 hours. The product was filtered, washed with deionized (DI) water, and dried at ~250° F. (~120° C.). The XRD spectrum of the as-synthesized material in FIG. 2a appeared to show a mixed phase of ZSM-5 and ZSM-12 topology. In FIG. 2b, SEM micrographs of the as-synthesized material appeared to show that the material was composed of agglomerates of relatively small crystals of ZSM-12 and an impurity phase of relatively large crystals of siliceous ZSM-5. Based on the SEM micrographs, the ZSM-5 crystals appeared to have a characteristic size of ~10 µm or greater, while the ZSM-12 crystals appeared to have a characteristic size of ~1-5 µm. It was noted that the synthesis mixture in this Comparative Example 2 would have been included within the definition of a synthesis mixture suitable for formation of ZSM-12, both based on the pure phase generated in Comparative Example 1 and based on the resulting crystals corresponding to ZSM-12 with ZSM-5 impurities.

Comparative Example 3

Formation of ZSM-12 Without Use of Seed Crystals

ZSM-12 was synthesized using a mixture including methyltriethylammonium bromide (MTEABr) as the structure directing agent. The mixture was prepared to include water, an MTEABr solution (~7 parts MTEABr, ~2 parts water), a ~50 wt % solution of NaOH (in water), Al(OH)$_3$, and Ultrasil™ silica (~93 wt % SiO$_2$). The mixture had the molar composition shown in Table 5 below.

TABLE 5

| Comparative Example 3 | |
| --- | --- |
| Reactants | Molar ratio |
| SiO$_2$:Al$_2$O$_3$ | ~100 |
| H$_2$O:SiO$_2$ | ~21 |
| OH$^-$:SiO$_2$ | ~0.2 |
| M:SiO$_2$ | ~0.2 |
| SDA:SiO$_2$ | ~0.15 |

Figure 3A:
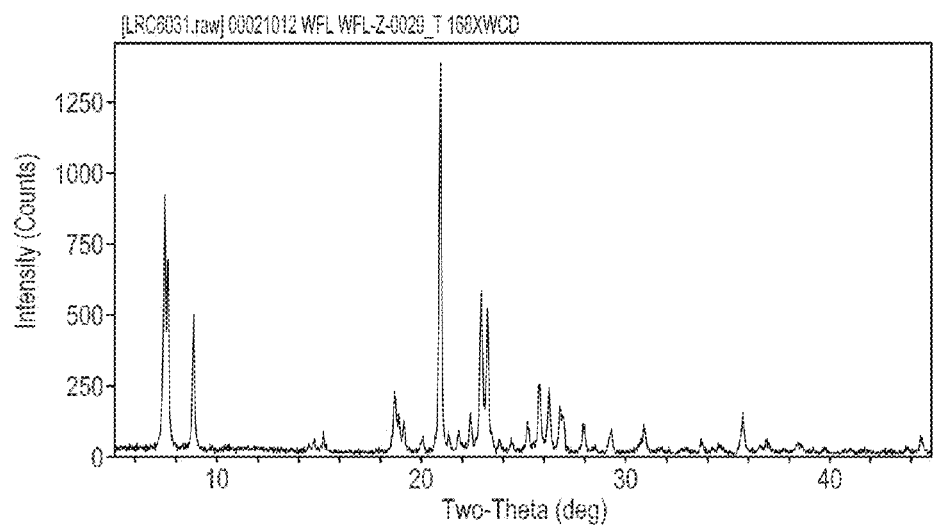
FIGS. 3a and 3b show respectively an XRD plot and an SEM image of ZSM-12 crystals.
Figure 3B:
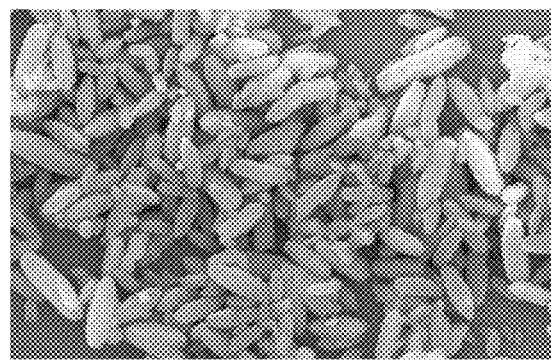

The mixture was reacted at 285° F. (140.5° C.) in an autoclave with stirring at 150 RPM for 168 hours. The product was filtered, washed with deionized (DI) water and dried at 250° F. (120° C.). The XRD pattern of the as-synthesized material in FIG. 3a show the typical pure phase of ZSM-12 topology. The SEM of the as-synthesized material in FIG. 3b shows that the material was composed of single large crystals (with an average crystal size of >2 microns) with rice-shaped morphology. The resulting product had an Si/Al$_2$ ratio of ~140/1.

Example 4

Formation of ZSM-5 in a ZSM-5 Contaminated Autoclave

ZSM-5 was synthesized using a mixture including tetraethylammonium bromide (TEABr) as the structure directing agent. The mixture was prepared to include water, a ~50 wt % solution of TEABr (in water), a ~50 wt % solution of NaOH (in water), a ~47% solution of aluminum sulfate (in water), and Hi-Sil™ 233 silica (~87 wt % SiO$_2$). No seeds were added during initial formation of the reaction mixture. However, the crystals were synthesized in an autoclave that was contaminated with ZSM-5 seeds. The mixture had the molar composition shown in Table 6 below.

TABLE 6

| Example 4 | |
| --- | --- |
| Reactants | Molar ratio |
| SiO$_2$:Al$_2$O$_3$ | ~250 |
| H$_2$O:SiO$_2$ | ~18.4 |

TABLE 6-continued

| Example 4 | |
|---|---|
| Reactants | Molar ratio |
| OH⁻:SiO₂ | ~0.15 |
| M:SiO₂ | ~0.16 |
| SDA:SiO₂ | ~0.27 |

Figure 4A:
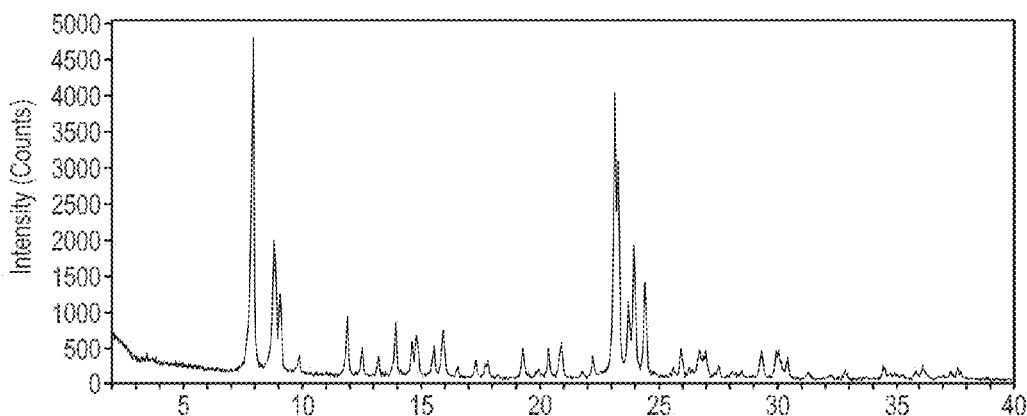
FIGS. 4a and 4b show respectively an XRD plot and an SEM image of ZSM-12 crystals with trace ZSM-5 impurities.
Figure 4B:
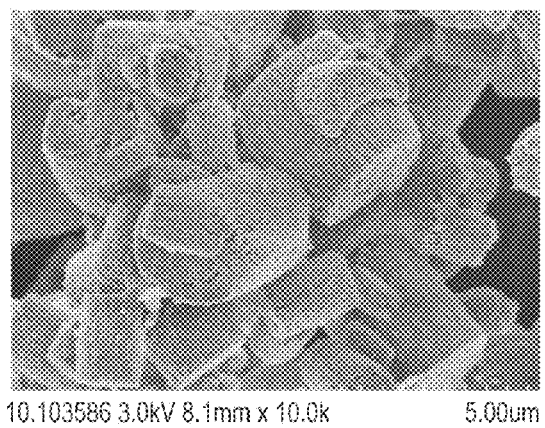

The mixture was reacted at ~280° F. (~138° C.) in an autoclave with stirring at ~250 rpm for ~72 hours. The product was filtered, washed with deionized (DI) water, and dried at ~250° F. (~120° C.). The XRD spectrum of the as-synthesized material in FIG. 4a appeared to show a pure phase ZSM-5 topology. In FIG. 4b, an SEM micrograph of the as-synthesized material appeared to show that the material was composed of agglomerates of relatively small crystals of ZSM-5 having a barrel-like morphology. The resulting ZSM-5 crystals appeared to have a $Si/Al_2$ molar ratio of ~191. The as-synthesized crystals were then converted into the hydrogen form by three ion-exchanges with an ammonium nitrate solution at room temperature (~20-25° C.), followed by drying at ~250° F. (~120° C.) and calcination at ~1000° F. (~538° C.) for about 6 hours. The resulting h-formed crystals were determined to exhibit a hexane sorption (via alpha test) of ~111 mg/g. The total surface area of the h-formed crystal was determined to be ~432 m²/g (~303 m²/g micropore; ~129 m²/g mesopore).

Example 5

Formation of ZSM-5

ZSM-5 was synthesized using a mixture including tetraethylammonium bromide (TEABr) as the structure directing agent. The mixture was prepared to include water, a ~50 wt % solution of TEABr (in water), a ~50 wt % solution of NaOH (in water), a ~47% solution of aluminum sulfate (in water), Hi-Sil™ 233 silica (~87 wt % $SiO_2$), and ZSM-5 seeds (~1 wt %, relative to the remaining mixture components). The mixture had the molar composition shown in Table 7 below.

TABLE 7

| Example 5 | |
|---|---|
| Reactants | Molar ratio |
| SiO₂:Al₂O₃ | ~250 |
| H₂O:SiO₂ | ~18.4 |
| OH⁻:SiO₂ | ~0.15 |
| M:SiO₂ | ~0.16 |
| SDA:SiO₂ | ~0.27 |

The mixture was reacted at ~280° F. (~138° C.) in an autoclave with stirring at ~250 rpm for ~72 hours. The product was filtered, washed with deionized (DI) water, and dried at ~250° F. (~120° C.). The XRD spectrum of the as-synthesized material in FIG. 5a appeared to show a pure phase ZSM-5 topology. In FIGS. 5b-5c, SEM micrographs of the as-synthesized material appeared to show that the material was composed of agglomerates of relatively small crystals. Based on the SEM micrographs, at least 50 vol % of the agglomerated crystals appeared to have a barrel-like morphology. FIG. 5b provides a side view of the barrel morphology, while FIG. 5c provides an end-on view for the morphology. It can be seen from FIGS. 5b-5c that the individual rod-like crystals or crystallites appeared to retain their individual identity as part of the aggregate or agglomerate barrel morphology.

The resulting ZSM-5 crystals appeared to have a $Si/Al_2$ molar ratio of ~180. The as-synthesized crystals were then converted into the hydrogen form by three ion-exchanges with an ammonium nitrate solution at room temperature (~20-25° C.), followed by drying at ~250° F. (~120° C.) and calcination at ~1000° F. (~538° C.) for about 6 hours. The resulting h-formed crystals were determined using the alpha testing protocols to exhibit an alpha value of ~140 and a hexane sorption of ~108 mg/g. The total surface area of the h-formed crystal was determined to be ~457 m²/g (~263 m²/g micropore; ~194 m²/g mesopore).

Example 6

Formation of ZSM-5

ZSM-5 was synthesized using a mixture including tetraethylammonium bromide (TEABr) as the structure directing agent. The mixture was prepared to include water, a ~50 wt % solution of TEABr (in water), a ~50 wt % solution of NaOH (in water), a ~47% solution of aluminum sulfate (in water), Hi-Sil™ 233 silica (~87 wt % $SiO_2$), and ZSM-5 seeds (~1 wt %, relative to the remaining mixture components). The mixture had the molar composition shown in Table 8 below.

TABLE 8

| Example 6 | |
|---|---|
| Reactants | Molar ratio |
| SiO₂:Al₂O₃ | ~250 |
| H₂O:SiO₂ | ~18.6 |
| OH⁻:SiO₂ | ~0.14 |
| M:SiO₂ | ~0.18 |
| SDA:SiO₂ | ~0.27 |

The mixture was reacted at ~280° F. (~138° C.) in an autoclave with stirring at ~250 rpm for ~72 hours. The product was filtered, washed with deionized (DI) water, and dried at ~250° F. (~120° C.). The XRD spectrum of the as-synthesized material appeared to show a pure phase ZSM-5 topology. In FIGS. 6a-6b, SEM micrographs of the as-synthesized material appeared to show that the material was composed of agglomerates of relatively small crystals in a barrel-like morphology.

The resulting ZSM-5 crystals appeared to have a $Si/Al_2$ molar ratio of ~90. The as-synthesized crystals were then converted into the hydrogen form by three ion-exchanges with an ammonium nitrate solution at room temperature (~20-25° C.), followed by drying at ~250° F. (~120° C.) and calcination at ~1000° F. (~538° C.) for about 6 hours. The resulting h-formed crystals were determined using the alpha testing protocols to exhibit an alpha value of ~190 and a hexane sorption of ~100 mg/g. The total surface area of the h-formed crystal was determined to be ~441 m²/g (~277 m²/g micropore; ~164 m²/g mesopore).

Example 7

Formation of ZSM-5

This example was meant to be similar to Example 4, but in this example ZSM-5 seeds were explicitly added to the synthesis mixture, as opposed to having ZSM-5 contamination in the autoclave used for the synthesis. This example was also meant to be similar to Example 5, but with a lower wt % of seeds in the initial synthesis mixture. ZSM-5 was synthesized using a mixture including tetraethylammonium bromide (TEABr) as the structure directing agent. The mixture was prepared to include water, a ~50 wt % solution of TEABr (in water), a ~50 wt % solution of NaOH (in water), a ~47% solution of aluminum sulfate (in water), Hi-Sil™ 233 silica (~87 wt % $SiO_2$), and ZSM-5 seeds (~0.01 wt %, relative to the remaining mixture components). The mixture had the molar composition shown in Table 9 below.

TABLE 9

| Example 7 | |
|---|---|
| Reactants | Molar ratio |
| $SiO_2:Al_2O_3$ | ~250 |
| $H_2O:SiO_2$ | ~18.4 |
| $OH^-:SiO_2$ | ~0.15 |
| $M:SiO_2$ | ~0.16 |
| $SDA:SiO_2$ | ~0.27 |

Figure 7A:
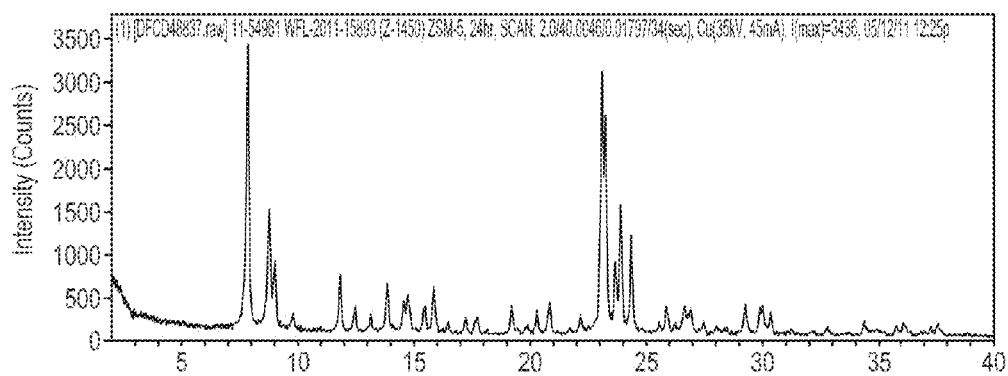
FIG. 7a shows an XRD plot of ZSM-5 crystals.
Figure 7B:
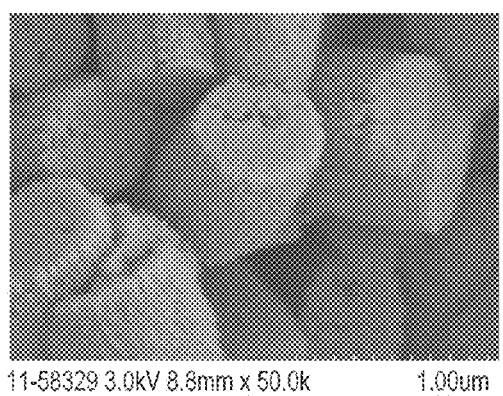
FIGS. 7b and 7c show SEM images of ZSM-5 crystals.
Figure 7C:
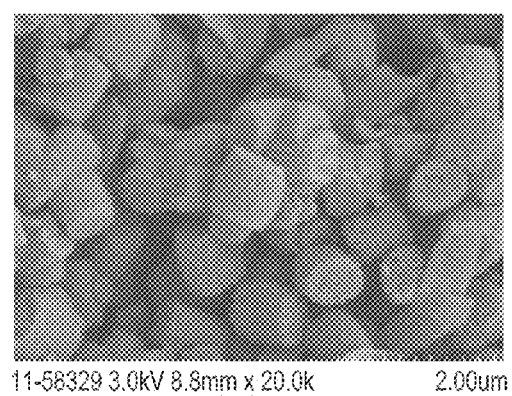

The mixture was reacted at ~280° F. (~138° C.) in an autoclave with stirring at ~250 rpm for ~72 hours. The product was filtered, washed with deionized (DI) water, and dried at ~250° F. (~120° C.). The XRD spectrum of the as-synthesized material in FIG. 7a appeared to show a pure phase ZSM-5 topology. In FIGS. 7b-7c, SEM micrographs of the as-synthesized material appeared to show that the material was composed of agglomerates of relatively small crystals in a barrel-like morphology. The crystallization was undertaken in about 24 hours.

The resulting ZSM-5 crystals appeared to have a $Si/Al_2$ molar ratio of ~191. The as-synthesized crystals were then converted into the hydrogen form by three ion-exchanges with an ammonium nitrate solution at room temperature (~20-25° C.), followed by drying at ~250° F. (~120° C.) and calcination at ~1000° F. (~538° C.) for about 6 hours. The resulting h-formed crystals were determined using the alpha testing protocols to exhibit an alpha value of ~63 and a hexane sorption of ~110 mg/g. The total surface area of the h-formed crystal was determined to be ~467 m$^2$/g (~338 m$^2$/g micropore; ~129 m$^2$/g mesopore).

Example 8

Formation of ZSM-5

ZSM-5 was synthesized using a mixture including tetra-ethylammonium bromide (TEABr) as the structure directing agent. The mixture was prepared to include water, a ~50 wt % solution of TEABr (in water), a ~50 wt % solution of NaOH (in water), a ~47% solution of aluminum sulfate (in water), Ultrasil™ silica (~93 wt % $SiO_2$), and ZSM-5 seeds (~1 wt %, relative to the remaining mixture components). The mixture had the molar composition shown in Table 10 below.

TABLE 10

| Example 8 | |
|---|---|
| Reactants | Molar ratio |
| $SiO_2:Al_2O_3$ | ~250 |
| $H_2O:SiO_2$ | ~18.4 |
| $OH^-:SiO_2$ | ~0.15 |

TABLE 10-continued

| Example 8 | |
|---|---|
| Reactants | Molar ratio |
| $M:SiO_2$ | ~0.16 |
| $SDA:SiO_2$ | ~0.27 |

The mixture was reacted at ~280° F. (~138° C.) in an autoclave with stirring at ~250 rpm for ~72 hours. The product was filtered, washed with deionized (DI) water, and dried at ~250° F. (~120° C.). The XRD spectrum of the as-synthesized material appeared to show a pure phase ZSM-5 topology. In FIG. 8, an SEM micrograph of the as-synthesized material appeared to show that the material was composed of agglomerates of relatively small crystals in a wine barrel-like morphology.

The resulting ZSM-5 crystals appeared to have a $Si/Al_2$ molar ratio of ~200. The as-synthesized crystals were then converted into the hydrogen form by three ion-exchanges with an ammonium nitrate solution at room temperature (~20-25° C.), followed by drying at ~250° F. (~120° C.) and calcination at ~1000° F. (~538° C.) for about 6 hours. The resulting h-formed crystals were determined using the alpha testing protocols to exhibit an alpha value of ~120 and a hexane sorption of ~108 mg/g. The total surface area of the h-formed crystal was determined to be ~447 m$^2$/g (~348 m$^2$/g micropore; ~120 m$^2$/g mesopore).

Example 9

Formation of ZSM-5

ZSM-5 was synthesized using a mixture including methyltriethylammonium chloride (MTEACl) as the structure directing agent. The mixture was prepared to include water, an aqueous MTEACl solution, a ~50 wt % solution of NaOH (in water), a ~45% solution of aluminum sulfate (in water), Hi-Sil™ 233 silica (~87 wt % $SiO_2$), and ZSM-5 seeds (~1 wt %, relative to the remaining mixture components). The mixture had the molar composition shown in Table 11 below.

TABLE 11

| Example 9 | |
|---|---|
| Reactants | Molar ratio |
| $SiO_2:Al_2O_3$ | ~200 |
| $H_2O:SiO_2$ | ~20 |
| $OH^-:SiO_2$ | ~0.16 |
| $M:SiO_2$ | ~0.16 |
| $SDA:SiO_2$ | ~0.18 |

The mixture was reacted at ~280° F. (~138° C.) in an autoclave with stirring at ~250 rpm for ~72 hours. The product was filtered, washed with deionized (DI) water, and dried at ~250° F. (~120° C.). The XRD spectrum of the as-synthesized material in FIG. 9a appeared to show a pure phase ZSM-5 topology. In FIGS. 9b-9c, SEM micrographs of the as-synthesized material appeared to show that the material was composed of agglomerates of relatively small crystals in a wine barrel-like morphology. The level of magnification in FIG. 9b was about twice the level of magnification in FIG. 9c.

The resulting ZSM-5 crystals appeared to have a $Si/Al_2$ molar ratio of ~114. The as-synthesized crystals were then converted into the hydrogen form by three ion-exchanges with an ammonium nitrate solution at room temperature (~20-25° C.), followed by drying at ~250° F. (~120° C.) and calcination at ~1000° F. (~538° C.) for about 6 hours. The resulting h-formed crystals were determined using the alpha testing protocols to exhibit an alpha value of ~160. The total surface area of the h-formed crystal was determined to be ~447 m²/g (~272 m²/g micropore; ~175 m²/g mesopore).

Example 10

Formation of ZSM-5

ZSM-5 was synthesized using a mixture including methyltriethylammonium chloride (MTEACl) as the structure directing agent. The mixture was prepared to include water, an aqueous MTEACl solution, a ~50 wt % solution of NaOH (in water), a ~45% solution of aluminum sulfate (in water), Hi-Sil™ 233 silica (~87 wt % $SiO_2$), and ZSM-5 seeds (~1 wt %, relative to the remaining mixture components). The mixture had the molar composition shown in Table 12 below.

TABLE 12

| Example 10 | |
|---|---|
| Reactants | Molar ratio |
| $SiO_2:Al_2O_3$ | ~110 |
| $H_2O:SiO_2$ | ~20 |
| $OH^-:SiO_2$ | ~0.17 |
| $M:SiO_2$ | ~0.17 |
| $SDA:SiO_2$ | ~0.18 |

Figure 10A:
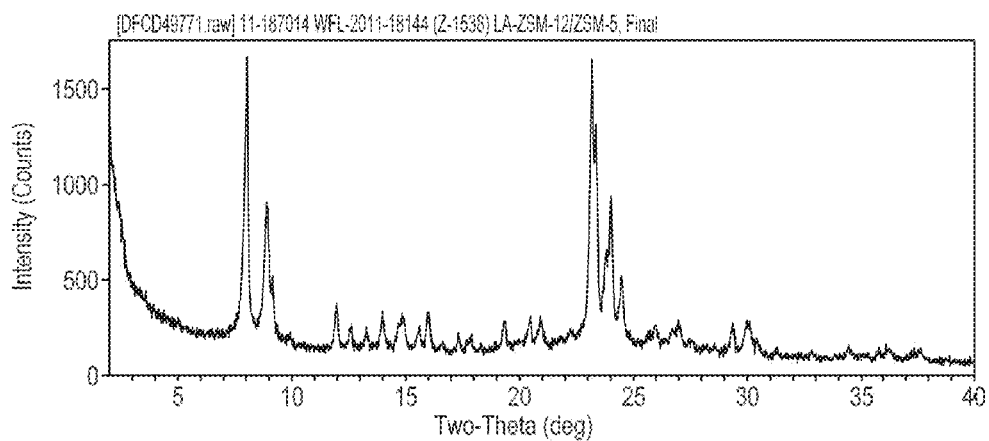
FIG. 10a shows an XRD plot of ZSM-5 crystals.
Figure 10B:
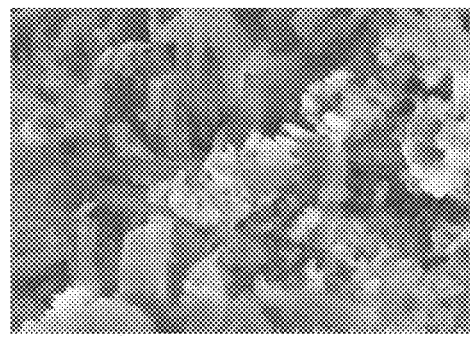
FIG. 10b shows an SEM image of ZSM-5 crystals.

The mixture was reacted at ~280° F. (~138° C.) in an autoclave with stirring at ~250 rpm for ~72 hours. The product was filtered, washed with deionized (DI) water, and dried at ~250° F. (~120° C.). The XRD spectrum of the as-synthesized material in FIG. 10a appeared to show a pure phase ZSM-5 topology. In FIG. 10b, an SEM micrograph of the as-synthesized material appeared to show that the material was composed of agglomerates with mixed morphologies.

The resulting ZSM-5 crystals appeared to have a $Si/Al_2$ molar ratio of ~71. The as-synthesized crystals were then converted into the hydrogen form by three ion-exchanges with an ammonium nitrate solution at room temperature (~20-25° C.), followed by drying at ~250° F. (~120° C.) and calcination at ~1000° F. (~538° C.) for about 6 hours. The resulting h-formed crystals were determined using the alpha testing protocols to exhibit an alpha value of ~190 and a hexane sorption of ~79 mg/g. The total surface area of the h-formed crystal was determined to be ~417 m²/g (~357 m²/g micropore; ~60 m²/g mesopore). The ZSM-5 crystals from this synthesis mixture did not appear to exhibit the typical properties that were observed in previous Examples, which may be due to the low $SiO_2/Al_2O_3$ ratio in the synthesis mixture, resulting in a product $Si/Al_2$ ratio less than 80:1.

Example 11

Formation of ZSM-5 (Comparative)

ZSM-5 was synthesized using a mixture including tetraethylammonium bromide (TEABr) as the structure directing agent. The mixture was prepared to include water, a ~50 wt % solution of TEABr (in water), a ~50 wt % solution of NaOH (in water), a ~47% solution of aluminum sulfate (in water), Hi-Sil™ 233 silica (~87 wt % $SiO_2$), and ZSM-5 seeds (~1 wt %, relative to the remaining mixture components). The mixture had the molar composition shown in Table 13 below.

TABLE 13

| Example 11 | |
|---|---|
| Reactants | Molar ratio |
| $SiO_2:Al_2O_3$ | ~65 |
| $H_2O:SiO_2$ | ~18.6 |
| $OH^-:SiO_2$ | ~0.13 |
| $M:SiO_2$ | ~0.2 |
| $SDA:SiO_2$ | ~0.27 |

Figure 11:
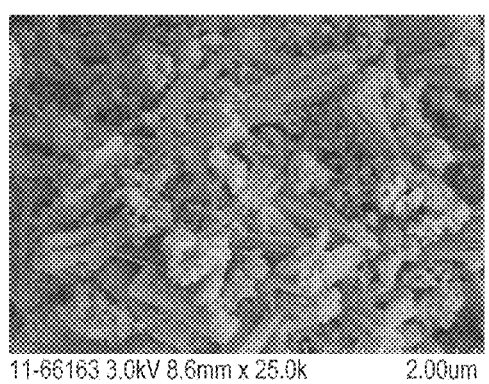
FIG. 11 shows an SEM image of ZSM-5 crystals.

The mixture was reacted at ~280° F. (~138° C.) in an autoclave with stirring at ~250 rpm for ~72 hours. The product was filtered, washed with deionized (DI) water, and dried at ~250° F. (~120° C.). The XRD spectrum of the as-synthesized material appeared to show a pure phase ZSM-5 topology. In FIG. 11, an SEM micrograph of the as-synthesized material appeared to show that the material was composed of agglomerates with mixed morphologies. Without being bound by theory, it is believed that the failure to attain the barrel-like morphology (and/or the relatively high surface area) can be attributed to the relatively low $Si/Al_2$ molar ratio (~57, in this case).

The as-synthesized crystals were then converted into the hydrogen form by three ion-exchanges with an ammonium nitrate solution at room temperature (~20-25° C.), followed by drying at ~250° F. (~120° C.) and calcination at ~1000° F. (~538° C.) for about 6 hours. The resulting h-formed crystals were determined using the alpha testing protocols to exhibit an alpha value of ~81 and a hexane sorption of ~50 mg/g. The total surface area of the h-formed crystal was determined to be ~251 m²/g (~199 m²/g micropore; ~51 m²/g mesopore). The ZSM-5 crystals from this synthesis mixture did not appear to exhibit the typical properties that were observed in previous Examples, which may be due to the low $SiO_2/Al_2O_3$ ratio in the synthesis mixture, resulting in a product $Si/Al_2$ ratio less than 80:1.

Example 12

Formation of ZSM-5

ZSM-5 was synthesized using a mixture including tetraethylammonium hydroxide (TEAOH) as the structure directing agent. The mixture was prepared to include water, a ~35 wt % solution of TEAOH (in water), a ~50 wt % solution of NaOH (in water), sodium aluminate sol (~45 wt % in water), Ultrasil™ PM silica (~93 wt % $SiO_2$), and ZSM-5 seeds (~1 wt %, relative to the remaining mixture components). The mixture had the molar composition shown in Table 14 below.

TABLE 14

| Example 12 | |
|---|---|
| Reactants | Molar ratio |
| $SiO_2:Al_2O_3$ | ~249 |
| $H_2O:SiO_2$ | ~14.7 |
| $OH^-:SiO_2$ | ~0.2 |
| $M:SiO_2$ | ~0.08 |
| $SDA:SiO_2$ | ~0.12 |

The mixture was reacted at ~320° F. (~160° C.) in an autoclave with stirring at ~250 rpm for ~72 hours. The product was filtered, washed with deionized (DI) water, and dried at ~250° F. (~120° C.). The XRD spectrum of the as-synthesized material appeared to show a pure phase ZSM-5 topology. An SEM micrograph of the as-synthesized material is shown in FIG. 12.

The resulting ZSM-5 crystals appeared to have a $Si/Al_2$ molar ratio of ~183. The as-synthesized crystals were then converted into the hydrogen form by three ion-exchanges with an ammonium nitrate solution at room temperature (~20-25° C.), followed by drying at ~250° F. (~120° C.) and calcination at ~1000° F. (~538° C.) for about 6 hours. The resulting h-formed crystals were determined using the alpha testing protocols to exhibit an alpha value of ~110 and a hexane sorption of ~107 mg/g. The total surface area of the h-formed crystal was determined to be ~474 m²/g (~308 m²/g micropore; ~166 m²/g mesopore).

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A porous crystalline material having a ZSM-5 framework structure,
   the crystalline material having an $XO_2:Y_2O_3$ ratio of at least about 80, where X is a tetravalent element selected from Si, Ge, Sn, or a combination thereof, and where Y is a trivalent element selected from Al, B, In, Ga, Fe, or a combination thereof;
   the crystalline material having a mesopore surface area of at least about 100 m²/g; and
   the crystalline material comprising crystals having a ZSM-5 framework structure and having a rod-like morphology, the crystals having a first crystal dimension corresponding to a crystal length, an average crystal length being about 0.1 µm to about 0.5 µm, and a second crystal dimension with an average dimension value that is about half the average crystal length or less.

2. The crystalline material of claim 1, wherein at least 50 vol % of the crystals having a ZSM-5 framework structure are primary crystallites that form secondary crystal aggregates, the first crystal dimension of the primary crystallites in the secondary crystal aggregates being substantially aligned, the secondary crystal aggregates having an average aggregate length that is at least 5 times the average crystal length, the crystal aggregates having an average aggregate width that is at least 10 times the average dimension value of the second crystal dimension.

3. The crystalline material of claim 1, wherein X is Si, Y is Al, and the crystals having a ZSM-5 framework structure are ZSM-5 crystals.

4. The crystalline material of claim 1, wherein the $XO_2:Y_2O_3$ ratio is at least about 100.

5. The crystalline material of claim 1, wherein the $XO_2:Y_2O_3$ ratio is at least about 150.

6. The crystalline material of claim 1, wherein the mesopore surface area is at least about 120 m²/g.

7. The crystalline material of claim 1, wherein the crystalline material is substantially pure, the substantially pure crystalline material comprising less than 10 wt % of crystalline material that has a framework structure different from a ZSM-5 framework structure.

8. The crystalline material of claim 1, wherein the total surface area of the crystals having a ZSM-5 framework structure is at least about 400 m²/g.

9. The crystalline material of claim 1, wherein at least a portion of the crystals having a ZSM-5 framework structure contain a structure directing agent within pores thereof.

10. A method for synthesizing a crystalline material having the framework structure of ZSM-5, comprising:
    forming a synthesis mixture capable of forming crystals with a zeolite framework structure, the mixture comprising water, a tetravalent oxide ($XO_2$), an alkali or alkaline earth hydroxide, and a structure directing agent, the mixture having an $XO_2:Y_2O_3$ ratio of at least about 50, the mixture being suitable for formation of crystals having a ZSM-12 framework structure in the absence of seed crystals having a ZSM-5 framework structure;
    adding from about 0.05 wt % to about 5 wt % of seed crystals having a ZSM-5 framework structure into the synthesis mixture; and
    recovering substantially pure crystals having a ZSM-5 framework structure from the synthesis mixture, the crystals having a ZSM-5 framework structure having an average size of at least 0.1 µm in at least one dimension, wherein X is a tetravalent element selected from Si, Ge, Sn, or a combination thereof, and wherein Y is a trivalent element selected from Al, B, In, Ga, Fe, or a combination thereof.

11. The method of claim 10, wherein X is Si and Y is Al.

12. The method of claim 10, wherein the $XO_2:Y_2O_3$ ratio in the synthesis mixture is at least about 100.

13. The method of claim 10, wherein the recovered crystals having a ZSM-5 framework structure have a mesopore surface area of at least about 100 m²/g.

14. The method of claim 10, wherein the recovered crystals having a ZSM-5 framework structure have an $XO_2:Y_2O_3$ ratio of at least about 80.

15. The method of claim 14, wherein at least 50 vol % of the recovered crystals are primary crystallites that form secondary crystal aggregates, a first crystal dimension of the primary crystallites in the secondary crystal aggregates being substantially aligned, the first crystal dimension having an average size of at least about 0.1 µm, the secondary crystal aggregates having an average aggregate length that is at least 5 times the average crystal length, the crystal aggregates having an average aggregate width that is at least 10 times the average dimension value of the second crystal dimension.

16. The method of claim 15, wherein the recovered crystals having a ZSM-5 framework structure have an $XO_2:Y_2O_3$ ratio of at least about 100.

17. The method of claim 10, wherein the structure directing agent is a tetraalkyl ammonium salt.

18. The method of claim 10, wherein the structure directing agent is a tetraethyl ammonium salt, a methyltriethyl ammonium salt, or a benzyltriethyl ammonium salt.

19. The method of claim 10, wherein the mixture is suitable for formation of crystals having a ZSM-12 framework structure in the absence of seed crystals.

20. A method for synthesizing a material with the framework structure of ZSM-5, comprising:
    forming a synthesis mixture capable of forming crystals with a zeolite framework structure, the mixture comprising water, a tetravalent oxide ($XO_2$), an alkali or alkaline earth hydroxide, and a structure directing agent, the mixture having an $XO_2:Y_2O_3$ ratio of at least about 100, the structure directing agent being suitable for formation of crystals having a ZSM-12 framework structure in the absence of seed crystals;
    adding from about 0.05 wt % to about 5 wt % of seed crystals having a ZSM-5 framework structure into the synthesis mixture; and
    recovering substantially pure crystals having a ZSM-5 framework structure from the synthesis mixture, the crystals having a ZSM-5 framework structure having an average size of at least 0.1 µm in at least one dimension, an $XO_2:Y_2O_3$ ratio of at least about 80, and a mesopore surface area of at least about 100 m$^2$/g,
wherein X is a tetravalent element selected from Si, Ge, Sn, or a combination thereof, and wherein Y is a trivalent element selected from Al, B, In, Ga, Fe, or a combination thereof.

* * * * *